(12) United States Patent
Matsumoto et al.

(10) Patent No.: US 9,593,587 B2
(45) Date of Patent: Mar. 14, 2017

(54) TURBINE SEAL FIN LEAKAGE FLOW RATE CONTROL

(75) Inventors: Kazuyuki Matsumoto, Tokyo (JP); Yoshihiro Kuwamura, Tokyo (JP); Hiroharu Oyama, Tokyo (JP); Yoshinori Tanaka, Tokyo (JP); Asaharu Matsuo, Kobe (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1157 days.

(21) Appl. No.: 13/580,078

(22) PCT Filed: Jan. 27, 2011

(86) PCT No.: PCT/JP2011/051576
§ 371 (c)(1),
(2), (4) Date: Aug. 20, 2012

(87) PCT Pub. No.: WO2011/105155
PCT Pub. Date: Sep. 1, 2011

(65) Prior Publication Data
US 2012/0321449 A1 Dec. 20, 2012

(30) Foreign Application Priority Data
Feb. 25, 2010 (JP) ................................ 2010-040920

(51) Int. Cl.
*F01D 11/00* (2006.01)
*F01D 11/08* (2006.01)
(Continued)

(52) U.S. Cl.
CPC ............ *F01D 11/001* (2013.01); *F01D 11/02* (2013.01); *F01D 11/08* (2013.01); *F16J 15/447* (2013.01);
(Continued)

(58) Field of Classification Search
CPC ........ F01D 11/001; F01D 11/02; F01D 11/04; F01D 11/08; F01D 11/10; F05D 2240/55;
(Continued)

(56) References Cited

U.S. PATENT DOCUMENTS 1,482,031 A * 1/1924 Parsons et al. ................ 277/420
1,756,958 A * 5/1930 Schmidt ......................... 415/131
(Continued)

FOREIGN PATENT DOCUMENTS

CN 1427921 A 7/2003
CN 1719042 A 1/2006
(Continued)

OTHER PUBLICATIONS

Ishizaka, JP 11200810 English machine Translation, translated Jun. 10, 2015 by Japan Platform for Patent Information <https://www4.j-platpat.inpit.go.jp/cgi-bin/tran_web_cgi_ejje?u=http://www4.j-platpat.inpit.go.jp/eng/translation/201506110545368417668747929782396CF89D67F4DC3327F-E55AC6299448711C.*
(Continued)

*Primary Examiner* — Nathaniel Wiehe
*Assistant Examiner* — Wayne A Lambert
(74) *Attorney, Agent, or Firm* — Westerman, Hattori, Daniels & Adrian, LLP

(57) ABSTRACT

Provided is a turbine in which seal fins (15) are provided to a hub shroud (41) to protrude toward a bottom surface (33a) of an annular groove (33), small gaps (H) are formed between the tip ends of the seal fins and the bottom surface of the annular groove, and assuming that the axial distance between a first seal fin (15a) disposed on the front edge side of the hub shroud among the seal fins and a front edge (41a) of the hub shroud is (L) and the axial distance between the
(Continued)

front edge of the hub shroud and an inside surface (33b) of the annular groove is (Bu), the first seal fin is disposed to satisfy L/Bu<0.3.

8 Claims, 6 Drawing Sheets

(51) Int. Cl.
  *F16J 15/447* (2006.01)
  *F01D 11/02* (2006.01)
(52) U.S. Cl.
  CPC .... *F05D 2220/31* (2013.01); *F05D 2240/127* (2013.01); *F05D 2240/55* (2013.01)
(58) Field of Classification Search
  CPC ........... F05D 2240/57; F05D 2240/127; F05D 2220/31; F05D 2250/294; F16J 15/447; F16J 15/4472; F16J 15/4476
  See application file for complete search history.

(56) References Cited

U.S. PATENT DOCUMENTS

| | | | | |
|---|---|---|---|---|
| 2,123,818 | A | * | 7/1938 | Ernst .......................... 277/419 |
| 3,251,601 | A | * | 5/1966 | Harvey ........................ 277/424 |
| 3,746,462 | A | * | 7/1973 | Fukuda ........................ 415/115 |
| 3,897,169 | A | * | 7/1975 | Fowler ...................... 415/173.6 |
| 4,046,388 | A | * | 9/1977 | Meyer .......................... 277/418 |
| 4,662,820 | A | * | 5/1987 | Sasada et al. ............. 415/173.6 |
| 5,029,876 | A | * | 7/1991 | Orlando et al. .............. 277/419 |
| 5,244,216 | A | * | 9/1993 | Rhode .......................... 277/303 |
| 5,735,667 | A | * | 4/1998 | Sanders et al. ............ 415/170.1 |
| 6,168,377 | B1 | * | 1/2001 | Wolfe et al. ............... 415/174.2 |
| 6,962,342 | B2 | * | 11/2005 | Wieghardt .................... 277/415 |
| 7,338,255 | B2 | * | 3/2008 | Nabesaka et al. ......... 415/173.6 |
| 7,344,357 | B2 | * | 3/2008 | Couture et al. ............ 415/174.2 |
| 7,445,213 | B1 | * | 11/2008 | Pelfrey ......................... 277/418 |
| 7,731,478 | B2 | * | 6/2010 | Chevrette et al. ......... 415/173.5 |
| 8,002,286 | B1 | * | 8/2011 | El-Aini et al. ............... 277/412 |
| 8,206,082 | B2 | * | 6/2012 | Sanchez ............... F16J 15/4472 277/418 |
| 8,333,557 | B2 | * | 12/2012 | John ...................... F01D 11/10 415/171.1 |
| 9,353,640 | B2 | * | 5/2016 | Kuwamura ............. F01D 11/10 |
| 2007/0147990 | A1 | * | 6/2007 | Kamimura et al. ....... 415/173.1 |
| 2009/0110550 | A1 | * | 4/2009 | Tani et al. .................. 415/199.2 |

FOREIGN PATENT DOCUMENTS

| | | |
|---|---|---|
| CN | 1924301 A | 3/2007 |
| CN | 1987165 A | 6/2007 |
| CN | 101078440 A | 11/2007 |
| EP | 1331362 A2 | 7/2003 |
| JP | 51-82855 A | 7/1976 |
| JP | 53-104803 U | 8/1978 |
| JP | 2-245581 A | 10/1990 |
| JP | 4-187801 A | 7/1992 |
| JP | 10-252412 A | 9/1998 |
| JP | 11-200810 A | 7/1999 |
| JP | 2002-180802 A | 6/2002 |
| JP | 2003-65076 A | 3/2003 |
| JP | 2005-146977 A | 6/2005 |
| JP | 2005-214144 A | 8/2005 |
| JP | 2006-22681 A | 1/2006 |
| JP | 2006-291967 A | 10/2006 |
| JP | 2008-169705 A | 7/2008 |

OTHER PUBLICATIONS

Steven Spar, Human Partial Translation of JP 11-200810 A, Oct. 18, 2016, para [0023],[0027].*
Japanese Office Action dated Sep. 3, 2013, issued in corresponding Japanese Patent Application No. 2010-040920, W/ English translation.
International Search Report of PCT/JP2011/051576, date of mailing Apr. 19, 2011, with Form PCT/ISA/237.
Office Action dated Feb. 12, 2014, Japanese Patent Application No. 2012-040920, with English Translation (7 pages).
Office Action dated Mar. 31, 2014, issued in Chinese Patent Application No. 201180004978.X with Partial English Translation (10 pages).
Extended European Search Report dated May 6, 2014, issued in European Patent Application No. 11747119.3-1610/2540987 (6 pages).
Decision to Grant a patent dated Oct. 12, 2015 issued in counterpart European patent application No. 11747119.3. (2 pages).

* cited by examiner

TURBINE SEAL FIN LEAKAGE FLOW RATE CONTROL

TECHNICAL FIELD

The present invention relates to a turbine used in, for example, a power plant, a chemical plant, a gas plant, an ironworks, a ship, or the like.

Priority is claimed on Japanese Patent Application No. 2010-040920, filed on Feb. 25, 2010, the content of which is incorporated herein by reference.

BACKGROUND ART

Hitherto, as a type of steam turbine, a steam turbine which includes a plurality of stages each of which has a casing, a shaft body (rotor) rotatably provided inside the casing, stationary blades arranged to be fixed to the inner peripheral portion of the casing, and rotating blades provided in the radial forms to a shaft body on the downstream side of the stationary blades, has been known. Among such steam turbines, in the case of an impulse turbine, the pressure energy of the steam is converted into the velocity energy by the stationary blades, and the velocity energy is converted into rotational energy (mechanical energy) by the rotating blades. In addition, in the case of a reaction turbine, pressure energy is converted into velocity energy even in the rotating blades, and the velocity energy is converted into rotational energy (mechanical energy) by the reaction force of the ejected steam.

In such a type of steam turbine, there are many cases that gaps are formed in the radial direction between the tip end portion of the rotating blade and the casing that surrounds the rotating blade and forms the flow path of the steam, and gaps are also formed in the radial direction between the tip end portion of the stationary blade and the shaft body.

However, leakage steam passing through the gap at the tip end portion of the rotating blade to the downstream side does not impart rotational force to the rotating blade. In addition, leakage steam passing through the gap at the tip end portion of the stationary blade on the downstream side is not used by the stationary blade to convert pressure energy into velocity energy. Therefore, rotating force is rarely imparted to the rotating blade on the downstream side. Therefore, in order to enhance the performance of the steam turbine, the amount of leakage steam passing through the gaps needs to be reduced.

Here, a structure has been proposed in which a stepped portion of which the height is gradually increased from the upstream side toward the downstream side in the axial direction is provided at the tip end portion of a rotating blade and seal fins having gaps for the stepped portion are provided to a casing (for example, refer to Patent Document 1).

With this configuration, leakage flow passing through the gaps of the seal fins collides with the end edge portion (edge portion) forming the uneven surface of the stepped portion, so that flow resistance is increased. Therefore, the leakage flow rate passing through the gaps between the casing and the tip end portion of the rotating blade is reduced.

CITATION LIST

Patent Document

[Patent Document 1] Japanese Unexamined Patent Application, First Publication No. 2006-291967

SUMMARY OF INVENTION

Problems to be Solved by the Invention

However, in order to further realize a reduction in cost and an increase in performance of the stream turbine, for example, a structure in which the load per stage is increased by reducing the number of stages of the stationary blades and the rotating blades has been considered. In this structure, the pressure ratio per stage is increased. Therefore, the leakage flow rate passing through the seal fins is increased, so that the performance of the steam turbine is degraded.

The invention has been made in consideration of the above circumstances, and an object thereof is to provide a turbine with a further reduced leakage flow rate and high performance.

Means for Solving the Problems

In order to accomplish the object, a turbine according to the present invention includes: a blade; and a structure which is formed to surround a periphery of the blade and rotates relative to the blade. In addition, in the turbine according to the present invention, an annular groove that ensures a gap from a tip end of the blade is formed at a position of the structure corresponding to the tip end of the blade, at least one seal fin protrudes from the tip end of the blade toward a bottom surface of the annular groove, and a small gap in a radial direction is formed between the tip end of the seal fin and the bottom surface of the annular groove. Moreover, in the turbine according to the present invention, among the seal fins, assuming that an axial distance between the upstream end side seal fin disposed on the upstream end side of the blade and an upstream end of the blade is L and an axial distance between the upstream end of the blade and an inside surface on an upstream side of the annular groove is Bu, the upstream end side seal fin is disposed to satisfy:

$$L/Bu \leq 0.1 \quad (1)$$

With this configuration, in the turbine according to the present invention, a portion of the fluid of the master stream passing through the blade collides with the blade. In addition, the fluid that flows into the annular groove forms a first main vortex that rotates in the direction from the tip end of the upstream end side seal fin toward the bottom surface of the annular groove (downflow, flow toward the inside in the radial direction). Due to the first main vortex, a contraction flow effect of the fluid passing through the small gaps formed between the tip end of the seal fin and the bottom surface of the annular groove is obtained. Therefore, the leakage flow rate is reduced.

Here, as the upstream end side seal fin is disposed to satisfy Expression (1), the first main vortex that generates flow from the tip end of the upstream end side seal fin toward the bottom surface of the annular groove is reliably formed at the small gap between the tip end of the upstream end side seal fin and the bottom surface of the annular groove.

When the upstream end side seal fin is disposed at a position that does not satisfy Expression (1), a portion of the first main vortex is separated, and a separation vortex that rotates in the opposite direction to the rotational direction of the first main vortex is formed between the first main vortex and the upstream end side seal fin. Therefore, flow from the bottom surface of the annular groove toward the base end side of the upstream end side seal fin (upflow, flow toward the outside in the radial direction) is generated at the small gap between the tip end of the upstream end side seal fin and the bottom surface of the annular groove. In addition, there is a concern that the contraction flow effect of the fluid passing through the small gap may not be obtained.

In the turbine according to the present invention, the upstream end side seal fin is disposed to be in the same plane as the upstream end of the blade.

With this configuration, the first main vortex is efficiently used, and flow from the tip end of the upstream end side seal fin to the bottom surface of the annular groove is generated at the small gap between the tip end of the upstream end side seal fin and the bottom surface of the annular groove. Therefore, the a contraction flow effect of the fluid passing through the small gap is more reliably obtained.

In the turbine according to the present invention, a small annular groove is formed in the annular groove at a position corresponding to the upstream end of the blade.

With this configuration, the rotating center of the first main vortex is close to the small gap. Therefore, as the rotating center of the first main vortex is close to the small gap, stronger flow than the flow from the tip end of the upstream end side seal fin toward the bottom surface of the annular groove is generated at the small gap using a portion of the first main vortex in which the velocity in the radial direction is high. Therefore, a contraction flow effect of the fluid passing through the small gap is further reliably obtained.

In the turbine according to the present invention, a plurality of seal fins are provided to the tip end of the blade, and a stepped portion is provided in the annular groove from the upstream end of the blade toward a downstream side of the blade. In addition, the stepped portion is formed so that a height thereof is gradually lowered toward the downstream side due to at least one level, and a downstream side edge portion formed with the level is formed to be positioned between adjacent seal fins.

Here, the fluid passing through the small gap between the tip end of the upstream end side seal fin and the bottom surface of the annular groove collides with a second seal fin that is present next to the upstream end side seal fin on the downstream side. In addition, a second main vortex is formed in the cavity formed between the second seal fin and the upstream end side seal fin. The rotational direction of the second main vortex is the opposite direction to the rotational direction of the first main vortex, so that flow from the bottom surface of the annular groove toward the base end side of the seal fin is generated at the small gap between the second seal fin and the bottom surface of the annular groove.

However, by providing the stepped portion of which the height is gradually lowered toward the downstream side to the annular groove, a portion of the flow is separated from the second main vortex at the uneven surface. In addition, a separation vortex that rotates in the opposite direction to the rotational direction of the second main vortex is formed. Due to the separation vortex, flow from the tip end of the seal fin toward the bottom surface of the annular groove is generated at the small gap between the second seal fin and the bottom surface of the annular groove, so that the leakage flow rate is further reduced.

In the turbine according to the present invention, the small annular groove is formed in the annular groove at a position corresponding to at least any one of the seal fins among the seal fins positioned on the downstream side from the upstream end side seal fin.

With this configuration, the rotating center of the vortex formed in the small annular groove after the second seal fin is close to the corresponding small gap. Therefore, flow in the small gap from the tip end of the seal fin toward the bottom surface of the annular groove is increased, so that the leakage flow rate is more reliably reduced.

Effects of Invention

According to the present invention, the first main vortex that flows from the tip end of the upstream end side seal fin toward the bottom surface of the annular groove is formed. Therefore, the fluid passing through the small gap formed between the tip end of the seal fin and the bottom surface of the annular groove is contracted due to the first main vortex, so that the leakage flow rate is reduced.

MODE FOR CARRYING OUT THE INVENTION

First Embodiment

Steam Turbine

Next, a steam turbine according to a first embodiment of the present invention will be described on the basis of FIGS. 1 to 5.

Figure 1:
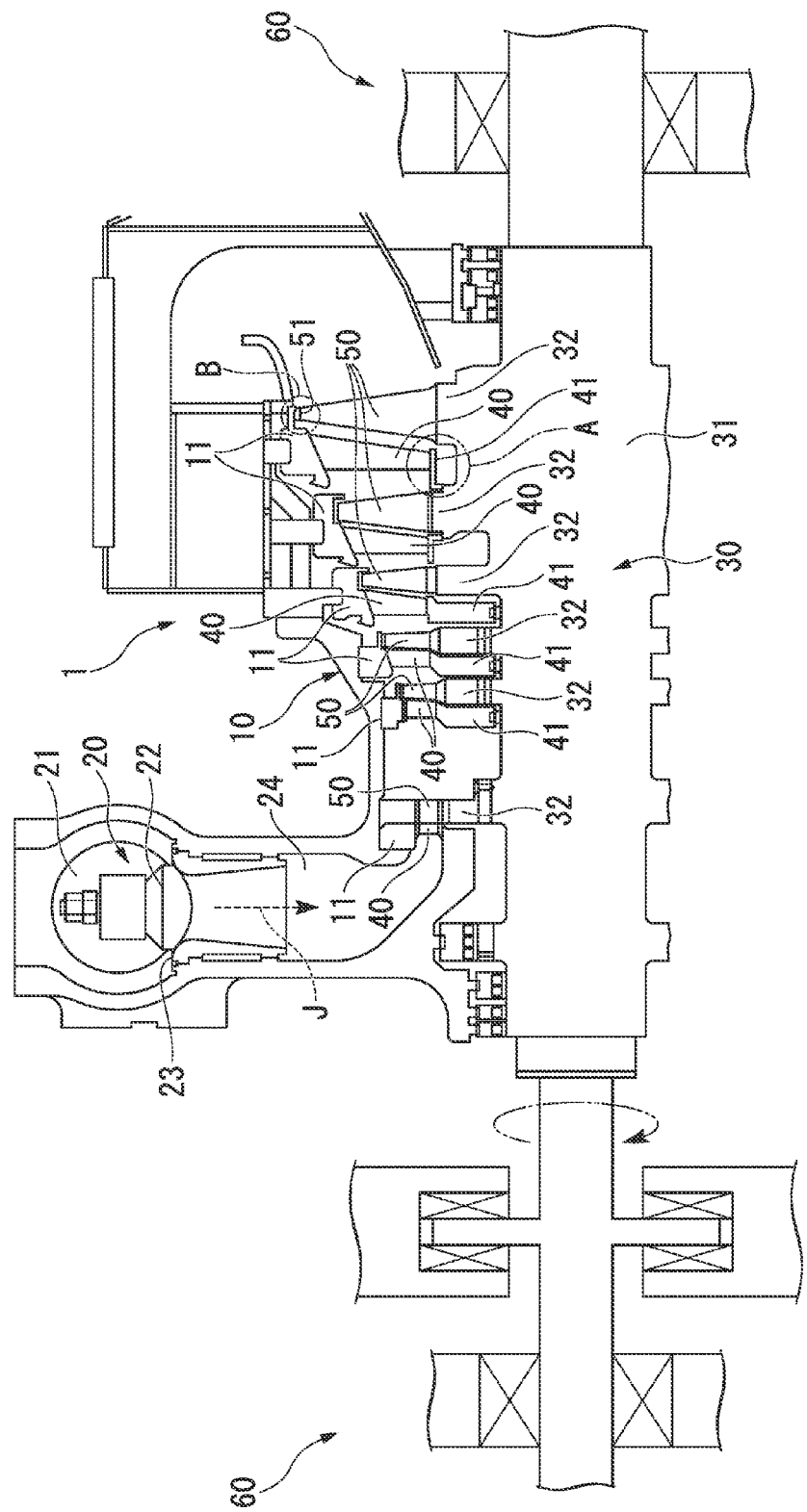
FIG. 1 is a cross-sectional view illustrating the schematic configuration of a steam turbine according to a first embodiment of the present invention.

FIG. 1 is a cross-sectional view illustrating the schematic configuration of the steam turbine 1 according to the first embodiment of the present invention.

The steam turbine 1 includes: a casing 10; regulating valves 20 that regulate the amount and pressure of the steam J that flows into the casing 10; a shaft body (rotor) 30 rotatably provided inside the casing 10 to transmit power to a machine such as a power generator (not shown); stationary blades 40 held in the casing 10; rotating blades 50 provided to the shaft body 30; and a bearing unit 60 that supports the shaft body 30 so as to be rotatable about the axis.

The casing 10 has an internal space that is airtightly sealed and is a flow path of the steam J. To the inner wall surface of the casing 10, ring-like partition plate outer races 11 into which the shaft body 30 is inserted are firmly fixed.

A plurality of the regulating valves 20 are mounted in the casing 10. Each of the regulating valves 20 includes a regulating valve chamber 21 into which the steam J flows from a boiler (not shown), a valve body 22, and a valve seat 23. In addition, when the valve body 22 separates from the valve seat 23, the steam flow path is opened, and the steam J flows into the internal space of the casing 10 via a steam chamber 24.

The shaft body 30 includes a shaft main body 31, and a plurality of discs 32 extending in the radial direction from the outer periphery of the shaft main body 31. The shaft body 30 transmits rotational energy to the machine such as a power generator (not shown).

A plurality of the stationary blades 40 are arranged in radial forms to surround the shaft body 30, constitute an annular stationary blade group, and are held by the respective partition plate outer races 11. To the insides in the radial direction (tip end sides) of the stationary blades 40, ring-like hub shrouds 41 into which the shaft body 30 is inserted are connected.

In addition, six annular stationary blade groups constituted by the plurality of the stationary blades 40 are formed at intervals in the rotating shaft direction. The annular stationary blade groups convert the pressure energy of the steam J into velocity energy so as to be guided to the adjacent rotating blade 50 side on the downstream side.

The rotating blades 50 are firmly mounted to the outer peripheral portions of the discs 32 included in the shaft body 30. A plurality of the rotating blades 50 are arranged in radial forms on the downstream sides of the corresponding annular stationary blade groups, thereby constituting annular rotating blade groups.

The annular stationary blade groups and the annular rotating blade groups are configured so that one set corresponds to one stage. That is, the steam turbine 1 is constituted by six stages. Particularly, the tip end portion of the rotating blade 50 at the final stage is a tip shroud 51 extending in the peripheral direction.

Here, in this embodiment, the shaft body 30 and the partition plate outer races 11 are referred to as "structures" according to the present invention. In addition, the stationary blades 40, the hub shrouds 41, the tip shroud 51, and the rotating blades 50 are referred to as "blades" according to the present invention. Specifically, in the case where the stationary blades 40 and the hub shrouds 41 are the "blades", the shaft body 30 is the "structure". On the other hand, in the case where the rotating blades 50 and the tip shroud 51 are the "blades", the partition plate outer faces 11 are the "structures".

Figure 2:
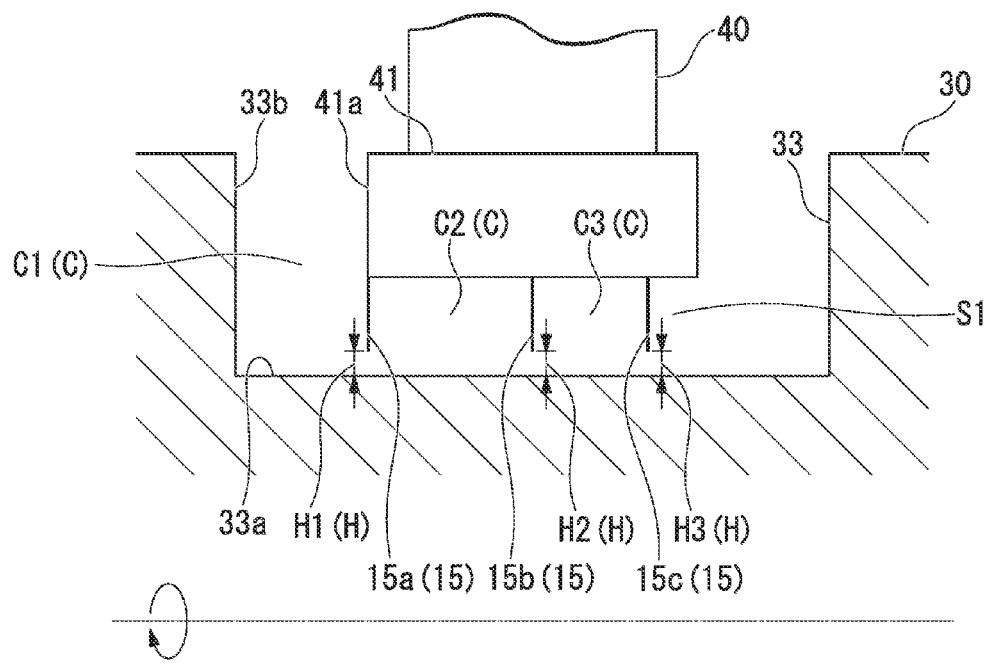
FIG. 2 is an enlarged view of portion A of FIG. 1.

FIG. 2 is an enlarged view of the portion A of FIG. 1.

As illustrated in FIG. 2, in the shaft body (structure) 30, an annular groove 33 is formed at a site corresponding to the stationary blade (blade) 40. In addition, the annular groove 33 faces the hub shroud (blade) 41 which becomes the tip end portion of the stationary blade 40. Due to the annular groove 33, a gap S1 in the radial direction is formed in the shaft body 30 between a bottom surface 33a of the annular groove 33 and the hub shroud 41. The annular groove 33 is formed so that the bottom surface 33a has substantially the same diameter with respect to the axial direction.

On the other hand, three seal fins 15 (15a, 15b, and 15c) protrude from the tip end of the hub shroud 41 (the lower side in FIG. 2, the inside surface in the radial direction of the hub shroud) toward the bottom surface 33a of the annular groove 33 along the radial direction so as to block the gap S1. The three seal fins 15 are constituted by a first seal fin (upstream end side seal fin) 15a disposed at an end surface 41a side (on the left side in FIG. 2) on the upstream side of the hub shroud 41, a second seal fin 15b disposed substantially at the center in the axial direction of the hub shroud 41, and a third seal fin 15c disposed on the downstream side (on the right side in FIG. 2) from the second seal fin 15b.

The seal fins 15 (15a to 15c) are set to have substantially the same length, and small gaps H (H1, H2, and H3) set to have substantially the same dimensions are respectively formed between the tip end portions and the bottom surface 33a of the annular groove 33.

The small gaps H (H1 to H3) are set to have minimum lengths in a safe range in which the bottom surface 33a of the annular groove 33 does not come in contact with the seal fins 15 (15a to 15c), after considering the thermal elongation amount of the shaft body 30 or the stationary blade 40, the centrifugal elongation amount of the shaft body 30, and the like.

In addition, in this embodiment, the case where the small gaps H between the tip end portions of the seal fins 15a to 15c and the bottom surface 33a of the annular groove 33 are set to be same has been described. However, the embodiment is not limited to this case, and the small gaps H between the tip end portions of the each seal fins 15a to 15c and the bottom surface 33a of the annular groove 33 may be changed as necessary.

In addition, in the annular groove 33, cavities C (C1 to C3) are formed between the shaft body 30 and the hub shroud 41. The cavities C (C1 to C3) are constituted by, in order from the upstream side, a first cavity C1 formed between an inside surface 33b on the upstream side of the annular groove 33 and the first seal fin 15a, a second cavity C2 formed between the first seal fin 15a and the second seal fin 15b, and a third cavity C3 formed between the second seal fin 15b and the third seal fin 15c.

Here, the first seal fin 15a is disposed to be in the same plane as the end surface 41a on the upstream side of the hub shroud 41. Therefore, a contraction flow effect is obtained in which the leakage flow of the steam J passing through the small gaps H formed between the first seal fin 15a and the bottom surface 33a of the annular groove 33 is reduced. This will be described in more detail as follows.

(Actions)

Figure 3:
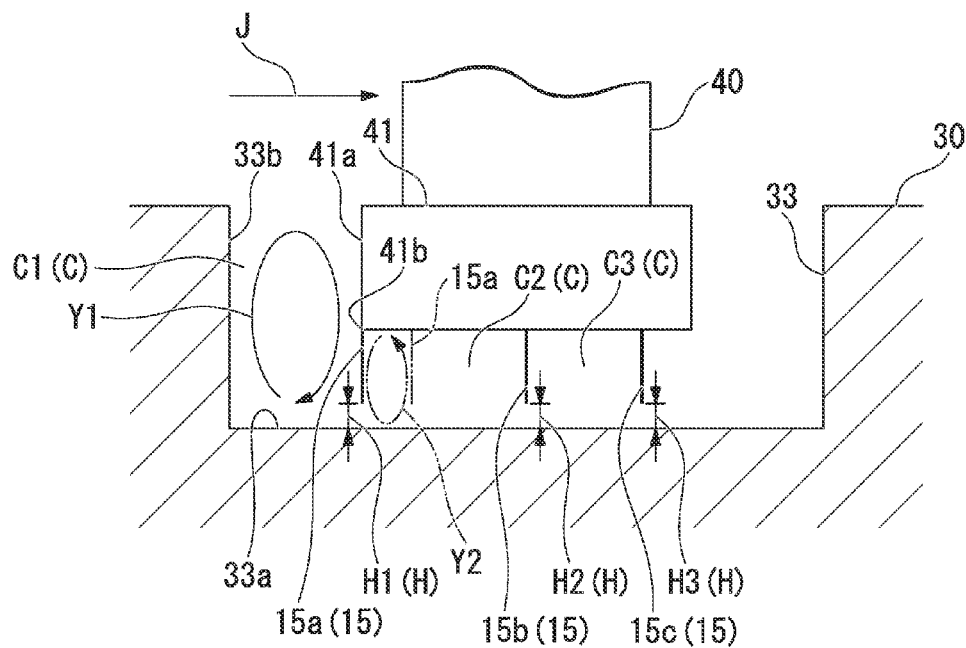
FIG. 3 is an explanatory view of the actions of seal fins according to the first embodiment of the present invention.

FIG. 3 is an explanatory view of the actions of the seal fins 15.

Here, before describing the contraction flow effect of the first seal fin 15a, the operations of the steam turbine 1 will be described with reference to FIG. 1.

First, when the regulating valve 20 enters an opened state, the steam J flows into the internal space of the casing 10 from the boiler (not shown).

The steam J that flows into the internal space of the casing 10 sequentially passes through the annular stationary blade groups and the annular rotating blade groups at the corresponding stages. Here, pressure energy is converted into velocity energy by the stationary blade 40. In addition, most of the steam J passing through the stationary blade 40 flows into the rotating blade 50 included in the same stage. In addition, the velocity energy of the steam J is converted into rotational energy by the rotating blade 50. Therefore, rotation is imparted to the shaft body 30.

On the other hand, a portion (for example, several %) of the steam J flows into the annular groove 33 facing the hub shroud 41 of the stationary blade 40. The steam J that flows into the annular groove 33 becomes so-called leakage steam.

As illustrated in FIG. 3, the portion of the steam J that flows into the annular groove 33 first flows into the first cavity C1 and collides with the end surface 41a on the upstream side of the hub shroud 41. In addition, the steam J flows toward the bottom surface 33a of the annular groove 33 along the first seal fin 15a. Thereafter, the steam J returns to the upstream side, thereby forming a main vortex (first main vortex) Y1 that rotates clockwise in FIG. 3.

That is, when the main vortex Y1 is formed, on the upstream side of the first seal fin 15a, flow of which the velocity vector is directed toward the inside in the radial direction (downflow) is generated. The downflow has inertia force toward the inside in the radial direction immediately before the small gap H1 formed between the first seal fin 15a and the bottom surface 33a of the annular groove 33. Therefore, an effect of reducing the leakage flow passing through the small gap H1 toward the inside in the radial direction (contraction flow effect) is obtained. Therefore, the leakage flow rate of the steam J is reduced.

Here, the first seal fin 15a is disposed to be in the same plane as the end surface 41a on the upstream side of the hub shroud 41 because, when the first seal fin 15a is disposed at a position separated from the end surface 41a on the upstream side of the hub shroud 41 by greater than or equal to a predetermined distance (see the double-dot-dashed line in FIG. 3), a portion of the flow is separated from the main vortex Y1 at an edge portion 41b of the end surface 41a of the upstream side of the hub shroud 41, and a separation vortex Y2 (shown by the double-dot-dashed line in FIG. 3) that rotates in the opposite direction (counterclockwise in FIG. 3) to the rotational direction of the main vortex Y1 is generated.

The rotational direction of the separation vortex Y2 is opposite to the rotational direction of the main vortex Y1. Therefore, when the separation vortex Y2 is generated, on the upstream side of the first seal fin 15a, upflow of which the velocity vector is directed toward the outside in the radial direction is generated. In addition, as the upflow is generated, the contraction flow effect with respect to the flow passing through the small gap H1 is not obtained.

That is, the position where the first seal fin 15a is disposed is not limited to the position that is in the same plane as the end surface 41a on the upstream side of the hub shroud 41. That is, the first seal fin 15a may be disposed at a position where flow from the tip end of the first seal fin 15a toward the bottom surface 33a of the annular groove 33 is generated on the upstream side of the first seal fin 15a.

Figure 4:
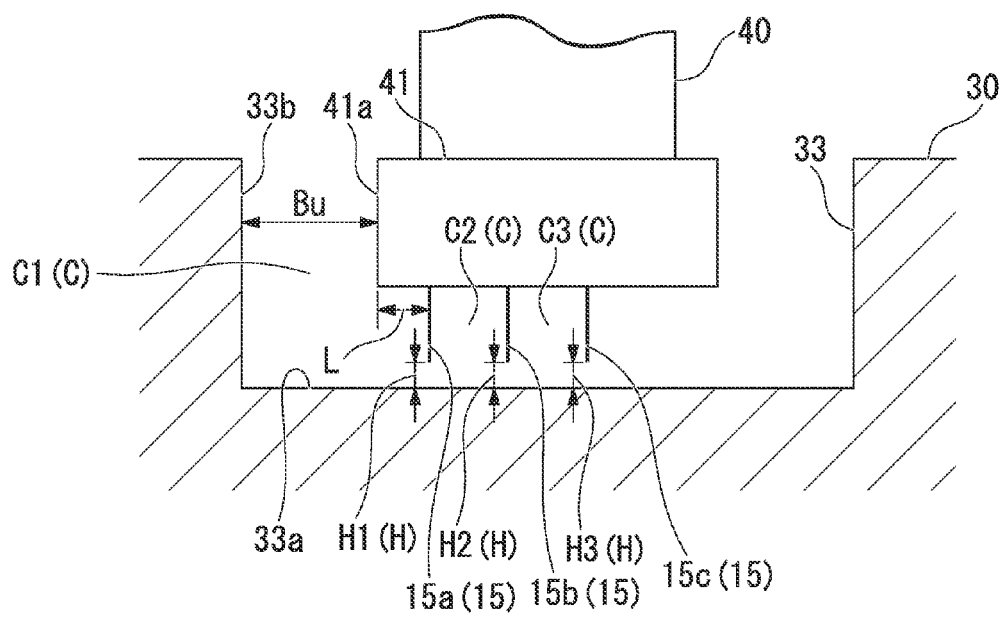
FIG. 4 is an explanatory view illustrating the relative positional relationship between a hub shroud and the seal fins according to the first embodiment of the present invention.

Here, on the basis of the knowledge that there is a condition by which the contraction flow effect is sufficiently obtained, the inventor of the present invention conducted the following simulation. As a result, as shown in FIG. 4, assuming that the axial distance of the shaft body 30 between the end surface 41a on the upstream side of the hub shroud 41 and the first seal fin 15a (strictly speaking, the end surface on the upstream side of the first seal fin 15a, the same applies hereinafter) is L and the axial distance of the shaft body 30 between the end surface 41a on the upstream side of the hub shroud 41 and the inside surface 33b of the annular groove 33 positioned on the upstream side in the axial direction is Bu, by disposing the first seal fin 15a to satisfy:

$$L/Bu \leq 0.1 \quad (1)$$

flow from the tip end of the first seal fin 15a toward the bottom surface 33a of the annular groove 33 is generated on the upstream side of the first seal fin 15a.

(Simulation)

Here, the results of the simulation concerning the relationship between the condition regarding the correlation between the distances L and Bu shown in FIG. 4 and the reduction ratio (%) of the leakage flow rate will be described.

Figure 5:
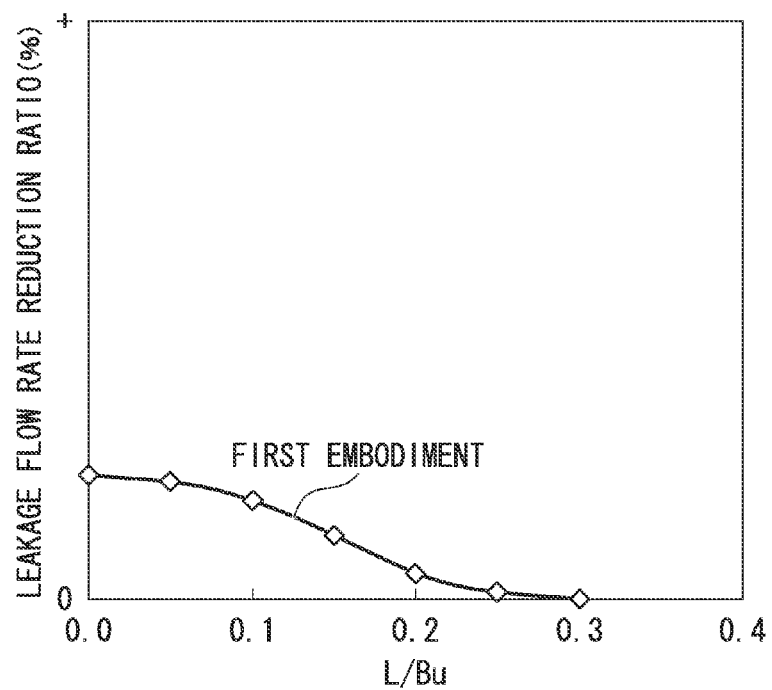
FIG. 5 is a graph showing a change in reduction ratio of leakage flow rate according to the first embodiment of the present invention.

FIG. 5 is a graph showing a change in the reduction ratio of the leakage flow rate. In FIG. 5, the vertical axis represents the reduction ratio (%) of the leakage flow rate, and the horizontal axis represents L/Bu.

As illustrated in FIG. 5, when the first seal fin 15a is disposed to satisfy:

$$L/Bu=0,$$

that is, is disposed to be in the same plane as the end surface 41a on the upstream side of the hub shroud 41, the reduction ratio of the leakage flow rate is maximized. The reduction ratio becomes about 80% of the maximum level (when L/Bu=0) in the case of L/Bu=0.1, becomes about 50% of the maximum level in the case of L/Bu=0.15, and becomes about 20% of the maximum level in the case of L/Bu=0.2.

That is, when the value of L/Bu exceeds 0.1, an effect of reducing the leakage flow rate is rapidly reduced, and thus the effective reduction in the leakage flow rate is not obtained. In addition, in the case of $$L/Bu=0.3,$$

the contraction flow effect of the flow passing through the small gap H1 is not substantially obtained.

Therefore, according to the first embodiment described above, as the first seal fin 15a is disposed to satisfy Expression (1), the leakage flow rate is effectively reduced, thereby enhancing turbine efficiency.

In addition, as the first seal fin 15a is disposed to be in the same plane as the end surface 41a on the upstream side of the hub shroud 41, the main vortex Y1 is efficiently used, and the flow from the tip end of the first seal fin 15a toward the bottom surface 33a of the annular groove 33 at the small gap H1 is generated. Therefore, the leakage flow rate is more reliably reduced.

Moreover, the seal fins 15 (15a to 15c) are provided in the hub shroud 41 as the blade other than in the shaft body 30 as the structure, a change in the relative positional relationship between the end surface 41a on the upstream side of the hub shroud 41 and the first seal fin 15a due to the thermal elongation amount of the shaft body 30 or the stationary blade 40, the centrifugal elongation amount of the shaft body 30, and the like may be prevented. Therefore, the effect of reducing the leakage flow rate is not changed depending on the drive conditions, and the effect of reducing the leakage flow rate is stably obtained.

Second Embodiment

Next, a second embodiment of the present invention will be described on the basis of FIGS. 6 and 7 with reference to FIG. 1. In addition, like elements which are the same as those of the first embodiment are denoted by like reference numerals (the same applies to the following embodiments).

Figure 6:
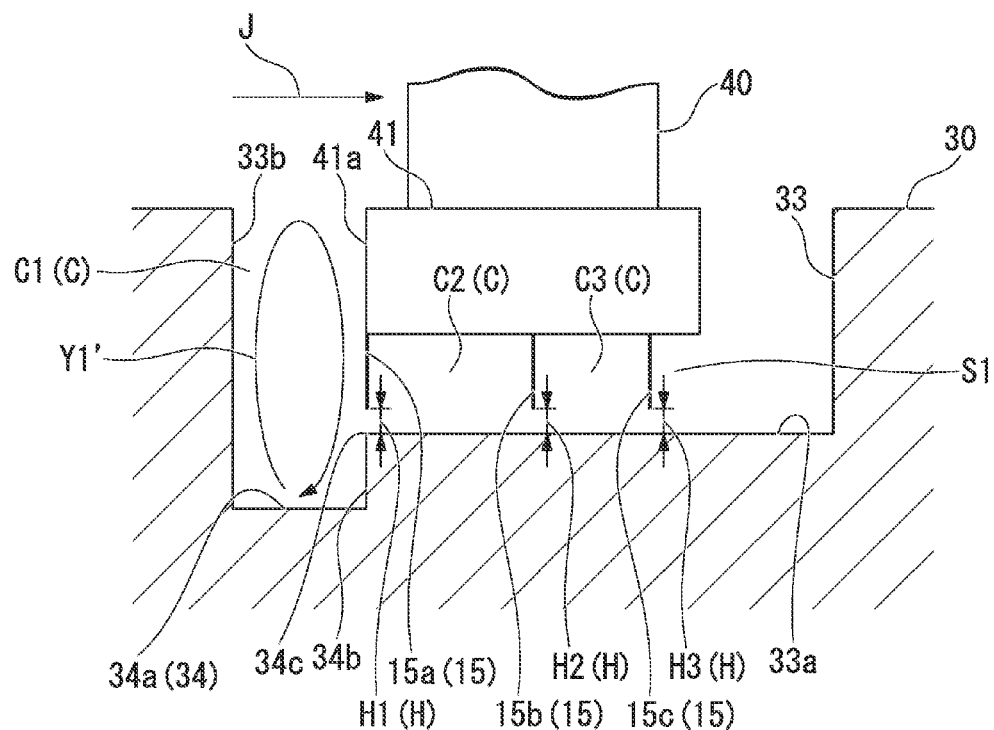
FIG. 6 is an explanatory view for explaining a second embodiment of the present invention and is a diagram corresponding to the enlarged view of portion A of FIG. 1.

FIG. 6 is an explanatory view for explaining the second embodiment and corresponds to FIG. 2 (the enlarged view of the portion A of FIG. 1).

In the second embodiment of the present invention, the basic configurations in which the steam turbine 1 includes the casing 10, the regulating valve 20 that regulates the amount and pressure of the steam J that flows into the casing 10, the shaft body (rotor) 30 rotatably provided inside the casing 10 to transmit power to the machine such as a power generator (not shown), the stationary blades 40 held in the casing 10, the rotating blades 50 provided to the shaft body 30, and the bearing unit 60 that supports the shaft body 30 so as to be rotatable about the axis, the plurality of the stationary blades 40 are arranged in radial forms to surround the shaft body 30, constitute the annular stationary blade group, and are held by the respective partition plate outer races 11, the ring-like hub shrouds 41 into which the shaft body 30 is inserted are connected to the insides in the radial direction of the stationary blades 40, the plurality of the rotating blades 50 are arranged in radial forms on the downstream sides of the corresponding annular stationary blade groups, thereby constituting annular rotating blade groups, the tip end portion of the rotating blade 50 is the tip shroud 51 extending in the peripheral direction, the annular stationary blade groups and the annular rotating blade groups are configured so that one set corresponds to one stage, the annular groove 33 is formed at the site corresponding to the stationary blade 40 in the shaft body 30 to face the hub shroud 41, and the like, are the same as those of the first embodiment described above (the same applies to the following embodiments).

Here, the second embodiment is different from the first embodiment in that a small annular groove 34 is formed at a site corresponding to the first cavity C1 in the bottom surface 33a of the annular groove 33 of the second embodiment, whereas the bottom surface 33a of the annular groove 33 of the first embodiment is formed to have substantially the same diameter in the axial direction.

That is, the three seal fins 15 (15a, 15b, and 15c) protrude from the tip end of the hub shroud 41 toward the bottom surface 33a of the annular groove 33 along the radial direction so as to block the gap S1. The first seal fin 15a is disposed to satisfy Expression (1), and preferably, is disposed to be in the same plane as the end surface 41a on the upstream side of the hub shroud 41.

In addition, the small annular groove 34 is formed in the bottom surface 33a corresponding to the first cavity C1 formed on the upstream side of the first seal fin 15a. The small annular groove 34 is formed so that an inside surface 34b thereof positioned on the downstream side in the axial direction is in the same plane as the first seal fin 15a.

(Actions)

Next, the actions of the second embodiment will be described.

In the above-described configuration, a steam which is a portion of the steam J that flows into the annular groove 33 collides with the end surface 41a on the upstream side of the hub shroud 41. In addition, the steam flows along the first seal fin 15a toward a bottom surface 34a of the small annular groove 34. Thereafter, the steam returns to the upstream side, thereby forming a main vortex (first main vortex) Y1' that rotates clockwise in FIG. 6.

That is, the main vortex Y1' passes through the vicinity on the upstream side in the axial direction of the small gap H1 formed between the tip end of the first seal fin 15a and the bottom surface 33a of the annular groove 33 while flowing along the first seal fin 15a. Moreover, the main vortex Y1' flows toward the bottom surface 34a of the small annular groove 34. In other words, the rotating center of the main vortex Y1' is closer to the small gap H1 than the main vortex Y1 in the first embodiment does. Therefore, using a portion of the main vortex Y1' where the velocity in the radial direction is increased in which the rotating center of the main vortex Y1' is closer to the small gap H1 than the main vortex Y1 in the first embodiment does, strong flow is generated in the small gap H1 from the tip end of the first seal fin 15a toward the bottom surface 33a of the annular groove 33.

Therefore, according to the second embodiment described above, compared to the effect of the first embodiment described above, the effect of reducing the leakage flow passing through the small gap H1 toward the inside in the radial direction (contraction flow effect) is further obtained. Therefore, the leakage flow rate of the steam J is reduced.

Figure 7:
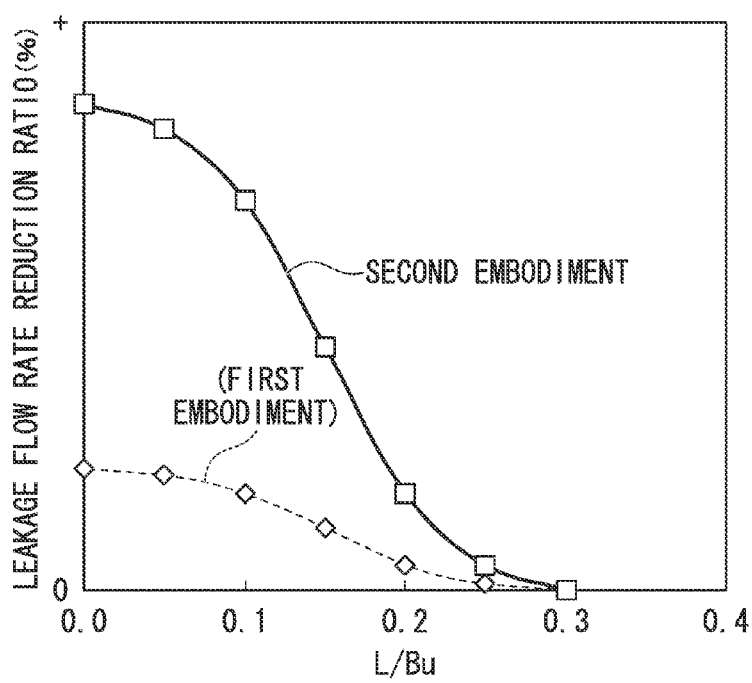
FIG. 7 is a graph showing a change in reduction ratio of a leakage flow rate of the second embodiment of the present invention.

FIG. 7 is a graph showing a change in the reduction ratio of the leakage flow rate of the second embodiment. In FIG. 7, L is the axial distance between the end surface 41a on the upstream side of the hub shroud 41 and the first seal fin 15a, and Bu is the axial distance between the end surface 41a on the upstream side of the hub shroud 41 and the inside surface 33b of the annular groove 33 positioned on the upstream side in the axial direction (see FIG. 4). In addition, in FIG. 7, the vertical axis represents the reduction ratio (%) of the leakage flow rate, and the horizontal axis represents L/Bu.

As shown in FIG. 7, the reduction ratio of the leakage flow rate of the second embodiment is enhanced compared to the reduction ratio of the leakage flow rate of the first embodiment (see FIG. 5 and the broken line of FIG. 7). In addition, as shown in FIG. 7, when the value of L/Bu exceeds 0.1, the effect of reducing the leakage flow rate is rapidly reduced, and thus it is difficult to obtain an effective reduction in the leakage flow rate.

In addition, in the second embodiment, the case where the small annular groove 34 is formed so that the inside surface 34b positioned on the downstream side in the axial direction of the small annular groove 34 is in the same plane as the first seal fin 15a has been described. However, the present invention is not limited to this configuration. For example, the relative position of the inside surface 34b of the small annular groove 34 to the first seal fin 15a may be misaligned in a range in which a separation vortex separated from the main vortex Y1' is not formed at an edge portion 34c of the small annular groove 34. Even in this case, the same effect as the second embodiment described above is obtained.

In addition, even though the relative positional relationship between the inside surface 34b of the small annular groove 34 positioned on the downstream side in the axial direction and the first seal fin 15a is satisfied when the steam turbine 1 is stopped, if the relative positional relationship is not satisfied when the steam turbine 1 is operated, the intended effect is not obtained. That is, even though the inside surface 34b of the small annular groove 34 positioned on the downstream side in the axial direction and the first seal fin 15a are formed to be in the same plane when the steam turbine 1 is stopped, if the inside surface 34b of the small annular groove 34 positioned on the downstream side in the axial direction and the first seal fin 15a are not formed to be in the same plane when the steam turbine 1 is operated, the intended effect is not obtained.

Therefore, it is preferable that the relative positional relationship between the inside surface 34b of the small annular groove 34 and the first seal fin 15a be satisfied when the steam turbine 1 is operated. That is, it is preferable that the inside surface 34b of the small annular groove 34 and the first seal fin 15a be formed to be in the same plane when the steam turbine 1 is operated.

Moreover, it is optimal to satisfy the relative positional relationship during a rated operation. That is, it is optimal to form the inside surface 34b of the small annular groove 34 positioned on the downstream side in the axial direction and the first seal fin 15a to be in the same plane during the rated operation.

Third Embodiment

Next, a third embodiment of the present invention will be described on the basis of FIG. 8.

Figure 8:
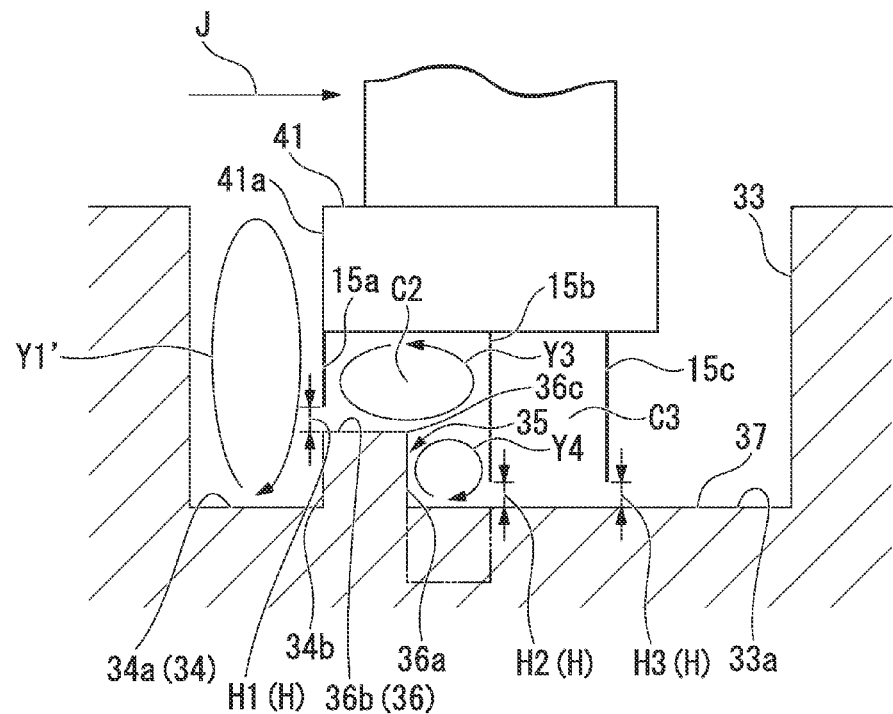
FIG. 8 is an explanatory view for explaining a third embodiment of the present invention and is a diagram corresponding to the enlarged view of the portion A of FIG. 1.

FIG. 8 is an explanatory view for explaining the third embodiment and corresponds to FIG. 2 (the enlarged view of the portion A of FIG. 1).

Here, the third embodiment is different from the second embodiment in that a stepped portion 35 is provided in the annular groove 33 of the third embodiment in addition to the small annular groove 34 whereas the small annular groove 34 is formed at the site corresponding to the first cavity C1 in the annular groove 33 of the second embodiment.

The stepped portion 35 has a projecting portion 36 projecting at a position of the bottom surface 33a of the annular groove 33 corresponding to the second cavity C2 toward the upstream side, that is, to be close to the first seal fin 15a. Due to the projecting portion 36, the height of the bottom surface 33a of the annular groove 33 is reduced by a stage toward the downstream side from the end surface 41a on the upstream side of the hub shroud 41, thereby forming the stepped portion 35.

In addition, the projecting portion 36 is formed so that a side surface 36a thereof on the downstream side and an edge portion 36c thereof on the downstream side are positioned between the first and second seal fins 15a and 15b which are adjacent, and preferably, substantially at the center in the axial direction of the second cavity C2.

That is, among the three seal fins 15 (15a to 15c) protruding from the hub shroud 41, the second and third seal fins 15b and 15c extend to form the small gaps H2 and H3 between the tip ends thereof and a first uneven surface 37.

(Actions)

Next, the actions of the third embodiment will be described.

In the above-described configuration, a steam which is a portion of the steam J that flows into the annular groove 33 collides with the end surface 41a on the upstream side of the hub shroud 41. In addition, the steam flows along the first seal fin 15a toward the bottom surface 34a of the small annular groove 34. Thereafter, the steam returns to the upstream side, thereby forming the main vortex Y1' that rotates clockwise in FIG. 6.

The leakage flow passing through the small gap H1 formed between the first seal fin 15a and an upper surface 36b of the projecting portion 36 positioned on the outside in the radial direction collides with the second seal fin 15b. In addition, the leakage flow returns to the upstream side, thereby forming a main vortex (second main vortex) Y3 that rotates counterclockwise in FIG. 7 in the second cavity C2.

Here, in the second cavity C2, since the stepped portion 35 (the projecting portion 36) is formed, a portion of the flow is separated from the main vortex Y3 at the edge portion 36c on the downstream side of the projecting portion 36. In addition, a separation vortex Y4 that rotates in the opposite direction (clockwise in FIG. 7) to the rotational direction of the main vortex Y3 is formed.

When the separation vortex Y4 is formed, downflow of which the velocity vector is directed toward the inside in the radial direction is generated on the upstream side of the second seal fin 15b. The downflow has inertia force toward the inside in the radial direction immediately before the small gap H2 formed between the second seal fin 15b and the first uneven surface 37. Therefore, the effect of reducing the leakage flow passing through the small gap H2 toward the inside in the radial direction (contraction flow effect) is obtained.

Therefore, according to the third embodiment described above, the leakage flow rate is further reduced compared to the second embodiment described above.

In addition, in the first uneven surface 37, a small annular groove (see the double-dot-dashed line in FIG. 8) may also be formed. In this case, it is preferable that the inside surface of the small annular groove positioned on the downstream side in the axial direction be formed to be in the same plane as the second seal fin 15b. As a result, the leakage flow rate is further reduced.

Fourth Embodiment

Next, a fourth embodiment of the invention will be described on the basis of FIG. 9.

Figure 9:
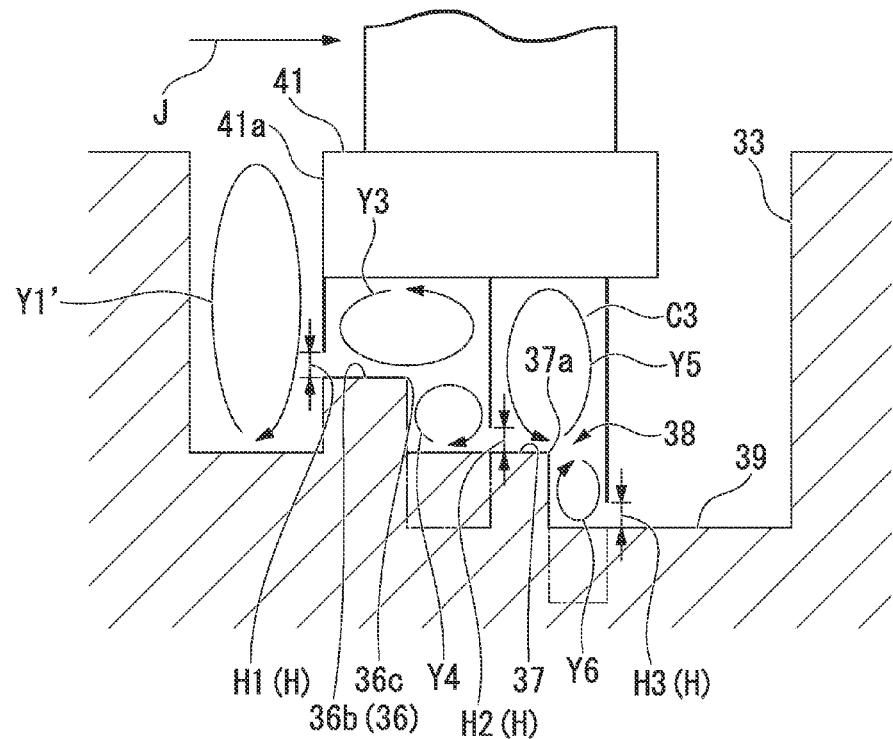
FIG. 9 is an explanatory view for explaining a fourth embodiment of the present invention and is a diagram corresponding to the enlarged view of the portion A of FIG. 1.

FIG. 9 is an explanatory view for explaining the fourth embodiment and corresponds to FIG. 2 (the enlarged view of the portion A of FIG. 1).

Here, the fourth embodiment is different from the third embodiment in that a two-stage stepped portion 38 is formed in the annular groove 33 of the fourth embodiment, whereas the single-stage stepped portion 35 is formed in the annular groove 33 of the third embodiment.

That is, in the annular groove 33 of the fourth embodiment, a second uneven surface 39 which is lowered by a stage is formed on the downstream side of the uneven surface 37. In addition, the second uneven surface 39 is formed so that an edge portion 37a on the downstream side of the uneven surface 37 is positioned between the second and third seal fins 15b and 15c which are adjacent, and preferably, is positioned substantially at the center in the axial direction of the third cavity C3.

Moreover, the three seal fins 15 (15a to 15c) protruding from the hub shroud 41 extend to form the small gaps H (H1 to H3) respectively between the tip ends thereof and the projecting portion 36, the first uneven surface 37, and the second uneven surface 39.

(Actions)

In the above-described configuration, in the third cavity C3, a main vortex Y5 that rotates counterclockwise in FIG. 9 is formed by the flow passing through the small gap H2. In addition, a portion of the flow is separated from the main vortex Y5 at the edge portion 37a on the downstream side of the first uneven surface 37, thereby forming a separation vortex Y6 that rotates in the opposite direction (clockwise in FIG. 9) to the rotational direction of the main vortex Y5.

Therefore, according to the fourth embodiment described above, compared to the third embodiment described above, the leakage flow rate is further reduced.

In addition, small annular grooves (see the double-dot-dashed lines in FIG. 9) may be formed in the first and second uneven surfaces 37 and 39. In this case, it is preferable that the inside surfaces positioned on the downstream sides in the axial direction of the small annular grooves be formed to be in the same planes as the second and third seal fins 15b and 15c, respectively. As a result, the leakage flow rate is further reduced.

Fifth Embodiment

Next, a fifth embodiment of the present invention will be described on the basis of FIG. 10 with reference to FIG. 1.

Figure 10:
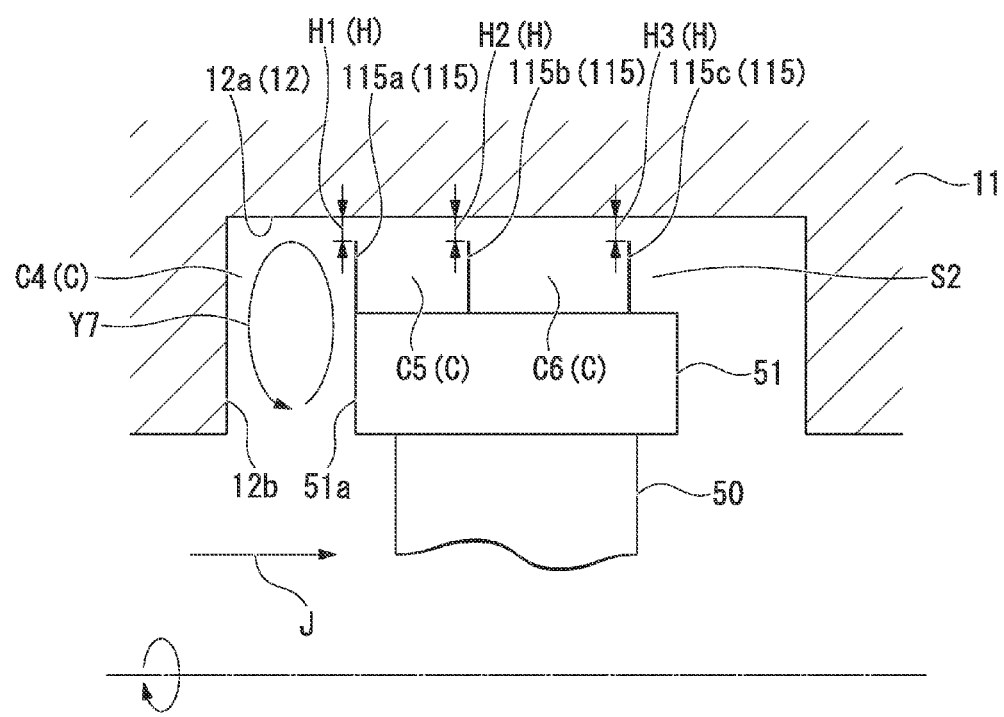
FIG. 10 is an enlarged view of the portion B of FIG. 1.

FIG. 10 is an enlarged view of the portion B of FIG. 1.

Here, the fifth embodiment is different from the first embodiment in that seal fins 115 are provided to the tip shroud 51 in the fifth embodiment, whereas the seal fins 15 are provided to the hub shroud 41 in the first embodiment.

As shown in FIG. 10, an annular groove 12 is formed at a site corresponding to the rotating blade (blade) 50 in the partition plate outer race (structure) 11. In addition, the annular groove 12 faces the tip shroud (blade) 51 which becomes the tip end portion of the rotating blade 50. A gap S2 in the radial direction of the shaft body 30 is formed between a bottom surface 12a of the annular groove 12 and the tip shroud 51 by the annular groove 12. The annular groove 12 is formed so that the bottom surface 12a has substantially the same diameter in the axial direction.

On the other hand, the three seal fins 115 (115a, 115b, and 115c) protrude from the tip end of the tip shroud 51 toward the bottom surface 12a of the annular groove 12 along the radial direction so as to block the gap S2. The three seal fins 115 are constituted by a first seal fin (upstream end side seal fin) 115a disposed at an end surface 51a (on the left in FIG. 10) on the upstream side of the tip shroud 51, a second seal fin 115b disposed substantially at the center in the axial direction of the tip shroud 51, and a third seal fin 115c disposed on the downstream side (on the right in FIG. 10) from the second seal fin 115b.

The seal fins 115 (115a to 115c) are set to have substantially the same length. In addition, between the tip end portions of the seal fins 115 and the annular groove 12, small gaps H (H1, H2, and H3) in the radial direction set to have substantially the same dimensions are respectively formed.

In this configuration, in the annular groove 12, cavities C (C4 to C6) are formed between the partition wall outer race 11 and the tip shroud 51. The cavities C (C4 to C6) are constituted by, in order from the upstream side, a first cavity C4 formed between an inside surface 12b positioned on the upstream side in the axial direction of the annular groove 12 and the first seal fin 115a, a second cavity C5 formed between the first seal fin 115a and the second seal fin 115b, and a third cavity C6 formed between the second seal fin 115b and the third seal fin 115c.

Here, the first seal fin 115a is disposed to be in the same plane as the end surface 51a on the upstream side of the tip shroud 51.

(Actions)

Next, the actions of the fifth embodiment of the present invention will be described.

When the steam turbine 1 is operated, a portion (for example, several %) of the steam J flows into the annular groove 12 ofacing the tip shroud 51 of the rotating blade 50. The portion of the steam J that flows into the annular groove 12 first flows into the first cavity C4 and collides with the end surface 51a on the upstream side of the tip shroud 51. In addition, the steam J flows toward the bottom surface 12a of the annular groove 12 so as to flow along the first seal fin 115a. Thereafter, the steam J returns to the upstream side, thereby forming a main vortex Y7 that rotates counterclockwise in FIG. 10.

That is, when the main vortex Y7 is formed, in the upstream side of the first seal fin 115a, flow of which the velocity vector is directed toward the outside in the radial direction is generated. The flow has inertia force toward the outside in the radial direction immediately before the small gap H1 formed between the first seal fin 115a and the bottom surface 12a of the annular groove 12. Therefore, the effect of reducing the leakage flow passing through the small gap H1 toward the outside in the radial direction (contraction flow effect) is obtained. Therefore, the leakage flow rate of the steam J is reduced.

Therefore, according to the fifth embodiment described above, the same effect as that of the first embodiment described above is obtained.

In addition, the present invention is not limited to the embodiments described above, and various modifications may be added to the embodiments described above without departing from the spirit of the present invention.

For example, the small annular groove 34 or the stepped portions 35 and 38 described in detail in the second, third, and fourth embodiments may be applied to the fifth embodiment described above.

In addition, in the first to fourth embodiments described above, the configuration in which the three seal fins 15a to 15c are provided to the hub shroud 41 has been described. In addition, in the fifth embodiment, the configuration in which the three seal fins 115a to 115c are provided to the tip shroud 51 has been described. However, to each of the hub shroud 41 and the tip shroud 51, an arbitrary number of seal fins 15 or 115 may be provided.

Moreover, in the embodiments described above, the case where the present invention is applied to the stationary blades 40 or the rotating blades 50 at the final stage has been described. However, the present invention may also be applied to the stationary blades 40 or the rotating blades 50 at other stages.

In addition, in the embodiments described above, the case where the steam turbine 1 is a condensing type steam turbine has been described. However, the present invention may also be applied to other types of steam turbines, for example, turbine types such as a two-stage extraction turbine, an extraction turbine, and a gas mixing type turbine. In addition, the present invention may also be applied to a gas turbine. Moreover, the present invention may also be applied to any device having rotary blades.

In addition, in the embodiments described above, the configuration in which the hub shroud 41 is provided on the tip end side of the stationary blade 40 and the tip shroud 51 is provided on the tip end side of the rotating blade 50 has been described. However, the present invention may also be applied to a configuration in which the hub shroud 41 and the tip shroud 51 are not provided. In this case, only the stationary blades 40 and the rotating blades 50 are the "blades" in the present invention. That is, in the case where the stationary blade 40 is the "blade", the shaft body 30 is the "structure". On the other hand, in the case where the rotating blade 50 is the "blade", the partition plate outer race 11 is the "structure". In addition, the seal fins 15 may be provided to the tip end of the stationary blade 40 and/or the seal fins 115 may be provided to the tip end of the rotating blade 50.

INDUSTRIAL APPLICABILITY

According to the present invention, the fluid passing through the small gaps formed between the tip ends of the seal fins and the bottom surface of the annular groove is reduced by the first main vortex, so that the leakage flow rate is reduced.

DESCRIPTION OF REFERENCE NUMERALS 1 steam turbine
11 partition plate outer race (structure)
12, 33 annular groove
12a, 33a bottom surface
12b, 33b inside surface
15, 115 seal fin
15a, 115a first seal fin (upstream end side seal fin)
15b, 115b second seal fin
15c, 115c third seal fin 30 shaft body (structure)
34 small annular groove
35, 38 stepped portion
36 projecting portion
36c, 37a edge portion
37 first uneven surface (level)
39 second uneven surface (level)
40 stationary blade (blade)
41 hub shroud (blade)
41a, 51a upstream side end surface (upstream end)
50 rotating blade (blade)
51 tip shroud (blade)
H (H1 to H3) small gap
S1, S2 gap
Y1, Y1', Y3, Y5, Y7 main vortex
Y2, Y4, Y6 separation vortex

The invention claimed is:

1. A turbine comprising:
a blade; and
a structure which is formed to surround a periphery of the blade and rotates relative to the blade,
wherein an annular groove that ensures a gap from a tip end of the blade is formed at a position of the structure corresponding to the tip end of the blade,
at least one seal fin protrudes from the tip end of the blade toward a bottom surface of the annular groove, and a small gap in a radial direction is formed between the tip end of the seal fin and the bottom surface of the annular groove,
among the seal fins, assuming that an axial distance between the upstream end side seal fin disposed on the upstream end side of the blade and an upstream end of the blade is L and an axial distance between the upstream end of the blade and an inside surface on an upstream side of the annular groove is Bu, the upstream end side seal fin is disposed to satisfy:

$L/Bu \leq 0.1$, a small annular groove is formed in the annular groove at a position corresponding to the upstream end of the blade, and
the upstream end side seal fin is disposed on the upstream end side of the blade among the seal fins is disposed to be in the same plane as an inside surface on a downstream side of the small annular groove.

2. The turbine according to claim 1,
wherein the upstream end side seal fin is disposed to be in the same plane as the upstream end of the blade.

3. The turbine according to claim 2,
wherein a plurality of the seal fins are provided to the tip end of the blade,
a stepped portion is provided in the annular groove from the upstream end of the blade toward a downstream side, and
the stepped portion is formed so that a height thereof is gradually lowered toward the downstream due to at least one level, and a downstream side edge portion formed with the level is formed to be positioned between the seal fins which are adjacent.

4. The turbine according to claim 3,
wherein the small annular groove is formed in the annular groove at a position corresponding to at least any one of the seal fins among the seal fins positioned on the downstream side from the upstream end side seal fin.

5. The turbine according to claim 2,
wherein the small annular groove is formed in the annular groove at a position corresponding to at least any one of the seal fins among the seal fins positioned on the downstream side from the upstream end side seal fin.

6. The turbine according to claim 1,
wherein a plurality of the seal fins are provided to the tip end of the blade,
a stepped portion is provided in the annular groove from the upstream end of the blade toward a downstream side, and
the stepped portion is formed so that a height thereof is gradually lowered toward the downstream due to at least one level, and a downstream side edge portion formed with the level is formed to be positioned between the seal fins which are adjacent.

7. The turbine according to claim 6,
wherein the small annular groove is formed in the annular groove at a position corresponding to at least any one of the seal fins among the seal fins positioned on the downstream side from the upstream end side seal fin.

8. The turbine according to claim 1,
wherein the small annular groove is formed in the annular groove at a position corresponding to at least any one of the seal fins among the seal fins positioned on the downstream side from the upstream end side seal fin.

* * * * *